United States Patent
Ghassemi-Armaki et al.

(10) Patent No.: US 12,517,001 B2
(45) Date of Patent: Jan. 6, 2026

(54) OPTICAL GAS IMAGING SYSTEM FOR LEAK DETECTION DURING BATTERY MANUFACTURING

(71) Applicant: GM GLOBAL TECHNOLOGY OPERATIONS LLC, Detroit, MI (US)

(72) Inventors: Hassan Ghassemi-Armaki, Northville, MI (US); Ranajit Ghosh, Novi, MI (US); Junjie Ma, Novi, MI (US); Robin James, Rochester Hills, MI (US); Blair E. Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 18/364,731

(22) Filed: Aug. 3, 2023

(65) Prior Publication Data
US 2025/0044181 A1    Feb. 6, 2025

(51) Int. Cl.
*G01M 3/38* (2006.01)

(52) U.S. Cl.
CPC .................. *G01M 3/38* (2013.01)

(58) Field of Classification Search
CPC ........ G01M 3/38; G01M 3/002; G01M 3/226; H01M 10/4228; G01N 21/3504
See application file for complete search history.

(56) References Cited

U.S. PATENT DOCUMENTS

| | | | |
|---|---|---|---|
| 5,523,569 A | 6/1996 | Hornfeld et al. | |
| 2008/0237466 A1* | 10/2008 | Key | G01J 5/0088 |
| | | | 382/141 |
| 2022/0268658 A1* | 8/2022 | Aechtler | G01J 5/0014 |
| 2024/0420311 A1* | 12/2024 | Speck | G01S 17/86 |

FOREIGN PATENT DOCUMENTS

| | | |
|---|---|---|
| DE | 102021120269 A1 | 2/2023 |
| WO | WO-2021094554 A2 | 5/2021 |

OTHER PUBLICATIONS

Office Action dated Apr. 5, 2024 from German Patent Office for German Patent No. 102023126184.3; 6pgs.

* cited by examiner

*Primary Examiner* — Tarifur R Chowdhury
*Assistant Examiner* — Carlos Perez-Guzman

(57) ABSTRACT

A leak detection system for a battery enclosure for one of a rechargeable energy storage system, a battery cell, a battery module, and/or a battery pack includes a gas delivery system configured to selectively provide a trace gas to the battery enclosure. A first optical gas imaging sensor is configured to generate images of a surface of the battery enclosure after the gas delivery system charges the battery enclosure with trace gas. The images are used to selectively detect a gas cloud adjacent to the surface of the of the battery enclosure. The gas cloud is used to determine a location of a gas leak on the surface of the battery enclosure.

17 Claims, 5 Drawing Sheets

OPTICAL GAS IMAGING SYSTEM FOR LEAK DETECTION DURING BATTERY MANUFACTURING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to gas leak detection for an enclosure of a rechargeable energy storage system (RESS), battery cell, battery module, or battery pack during manufacturing.

Electric vehicles (EVs) such as battery electric vehicles (BEVs), hybrid vehicles, and/or fuel cell vehicles include one or more electric machines and a RESS or a battery system including one or more battery cells, battery modules, and/or battery packs. Each of the battery cells includes a battery cell stack including anode electrodes, cathode electrodes and separators that generate vent gases during cycling. A power control system is used to control charging and/or discharging of the battery system during charging and/or driving.

The RESS, battery cells, battery modules and/or battery packs are typically housed in RESS, cell, module, or pack enclosures, respectively, that are hermetically sealed. Current processes for detecting leaks in the enclosures are expensive, time consuming, and/or incapable of identifying a specific location of the gas leak. Failure to locate the gas leak(s) during repair increases labor cost for the repairs. Battery pack enclosures may go through the repair process 2-3 times before the leak is repaired, which increases labor cost.

SUMMARY

A leak detection system for an enclosure includes a gas delivery system configured to selectively provide a trace gas to the enclosure. A first optical gas imaging sensor is configured to generate images of a surface of the enclosure after the gas delivery system charges the enclosure with trace gas. The images are used to selectively detect a gas cloud adjacent to the surface of the of the enclosure. The gas cloud is used to determine a location of a gas leak on the surface of the enclosure.

In other features, a positioning device is configured to position one of the first optical gas imaging sensor and the enclosure relative to the other of the first optical gas imaging sensor and the enclosure. The surface of the enclosure is arranged between the first optical gas imaging sensor and a temperature-controlled screen.

In other features, an outer surface of the temperature-controlled screen is black. The temperature-controlled screen is heated to a temperature in a range from 10° F. to 100° F. above an ambient temperature. The gas delivery system includes a trace gas source and a valve fluidly connecting the trace gas source to the enclosure. The gas delivery system includes a pump and a valve fluidly connecting the pump to the enclosure.

In other features, the gas delivery system supplies a trace gas selected from a group consisting of carbon dioxide ($CO_2$), a hydrocarbon, a volatile organic compound (VOC), methane, carbon monoxide (CO), helium (He), molecular hydrogen ($H_2$), and/or combinations thereof. The first optical gas imaging sensor includes a gas filter having a predetermined pass band around an absorption wavelength of the trace gas.

In other features, a controller is configured to communicate with the first optical gas imaging sensor, to detect the gas cloud adjacent to the surface of the enclosure, and to determine a position of a gas leak in response to the gas cloud.

In other features, the first optical gas imaging sensor is configured to take a first image of the surface of the enclosure before the trace gas is supplied by the gas delivery system, and to take a second image of the surface of the enclosure after the trace gas is supplied to the enclosure. The first optical gas imaging sensor is configured to reduce a field of view of the first optical gas imaging sensor after the second image in response to the gas cloud being identified and to take a third image using the reduced field of view, wherein the location of the gas leak is based on the third image. The first optical gas imaging sensor generates the images from a first portion of the surface of the enclosure and further comprising a second optical gas imaging sensor configured to generate images of the surface of the enclosure.

A method for detecting a gas leak in an enclosure includes selectively providing a trace gas to the enclosure; generating images of a surface of the enclosure using a first optical gas imaging sensor after the enclosure is charged with trace gas; selectively detecting a gas cloud adjacent to the surface of the of the enclosure; and in response to detecting the gas cloud, determining a location of a gas leak on the surface of the enclosure.

In other features, the method includes positioning one of the first optical gas imaging sensor and the enclosure relative to the other of the first optical gas imaging sensor and the enclosure. The method includes arranging the enclosure between a temperature-controlled screen and the first optical gas imaging sensor.

In other features, an outer surface of the temperature-controlled screen is black, and the temperature-controlled screen is heated to a temperature in a range from 10° F. to 100° F. above an ambient temperature.

In other features, the trace gas is selected from a group consisting of carbon dioxide ($CO_2$), a hydrocarbon, a volatile organic compound (VOC), methane, carbon monoxide (CO), helium (He), molecular hydrogen ($H_2$), and/or combinations thereof. The method includes using a gas filter having a predetermined pass band around an absorption wavelength of the trace gas.

In other features, the method includes taking a first image of the surface of the enclosure before the trace gas is supplied using the first optical gas imaging sensor; taking a second image of the surface of the enclosure after the trace gas is supplied to the enclosure using the first optical gas imaging sensor; reducing a field of view after the second image in response to the gas cloud being identified; and taking a third image using the reduced field of view using the first optical gas imaging sensor, wherein the location of the gas leak is determined in response to the third image.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While a leak detection system according to the present disclosure is illustrated below for an enclosure of a rechargeable energy storage system (RESS), a battery pack, a battery module, and/or a battery cell, the leak detection system can be used in other applications.

The leak detection system and method according to the present disclosure accurately identifies gas leaks in an enclosure of a RESS, a battery cell, a battery module, and/or a battery pack. The enclosure should be hermetically sealed during manufacturing. The leak detection system and method also determines a position of the leak(s) on the enclosure. In some examples, the leak detection system also quantitatively determines the leakage rate based on a size of a trace gas cloud in one or more directions. In other words, larger gas leaks produce large gas clouds and smaller leaks produce smaller gas clouds (given the same trace gas charge pressure).

The leak detection system and method includes an optical gas imaging sensor having a field of view directed at a surface of the RESS, battery cell, battery module, or battery pack. In some examples, the leak test is performed within a chamber that includes an exhaust system to allow evacuation of the trace gases. To provide a consistent temperature gradient background for the gas imaging, the enclosure is arranged between a temperature controlled screen and a field of view of the optical gas imaging sensor. In some examples, the optical gas imaging sensor and the screen are moved relative to the enclosure being tested. In some examples, the enclosure is moved relative to the optical gas imaging sensor and the screen.

In some examples, one or more first images are collected prior to supplying trace gas to the enclosure. Then, after charging the enclosure with the trace gas, the optical gas imaging sensor collects one or more second images. An image processor uses the first and second images to identify the shape of the trace gas emission cloud and estimates the specific location of the leak on the enclosure. Identification of the trace gas cloud and the specific location is based on a macro scale (due to large contrast between the trace gas and the background) to identify portions of the images containing leaks. In some examples, the field of view of the cameras are indexed or refocused to a narrower field of view to generate one or more third images with finer resolution to help identify the specific location of the leaks.

Figure 1:
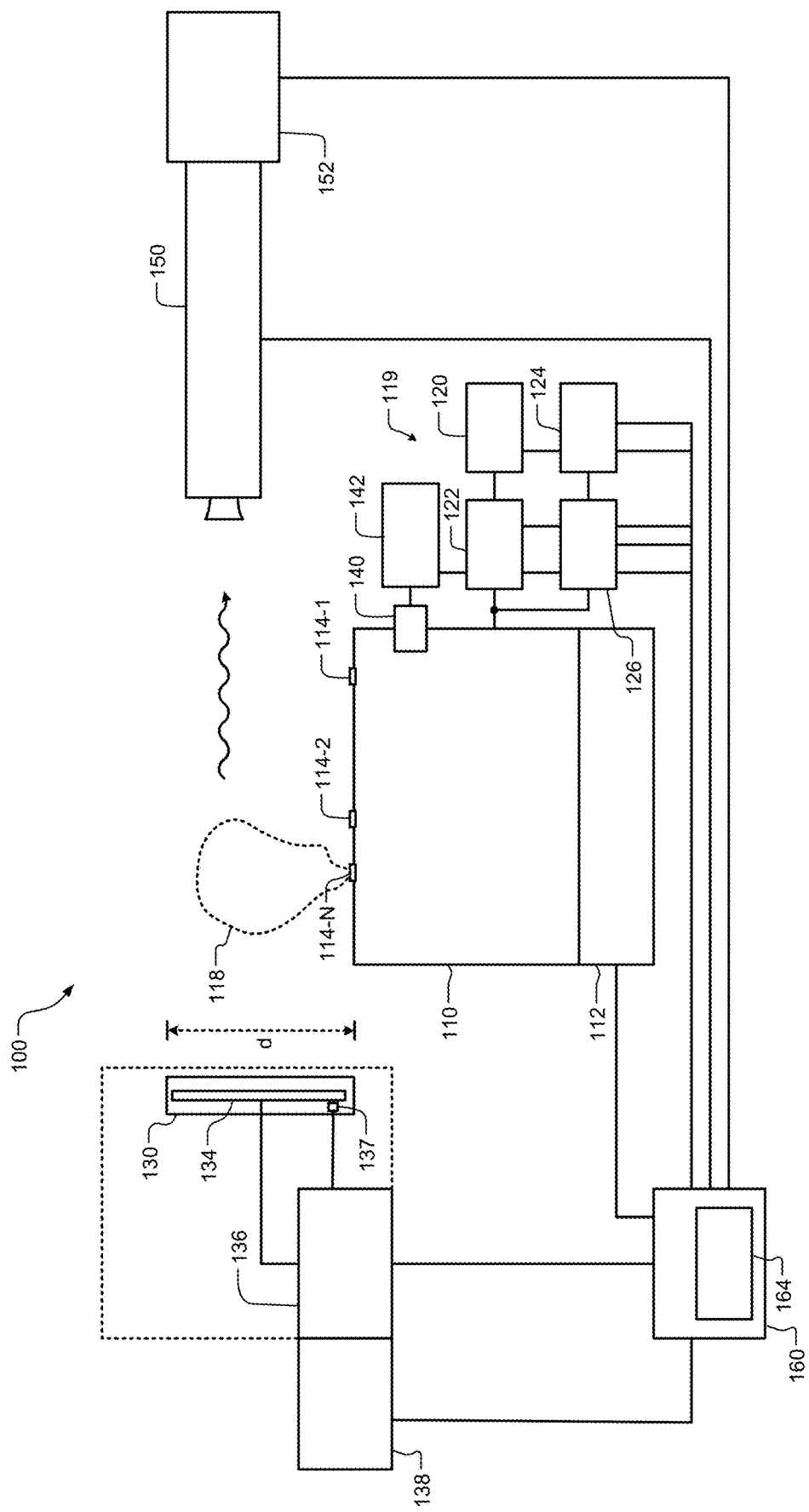
FIG. 1 is a functional block diagram of an example of a leak detection system for an enclosure of a rechargeable energy storage system, a battery pack, a battery module, and/or a battery cell according to the present disclosure.

Referring now to FIG. 1, a leak detection system 100 tests an enclosure 110 for gas leaks. For example, the enclosure 110 may surround a RESS, a battery cell, a battery module, or a battery pack. In some examples, the enclosure 110 is positioned using a positioning device 112 during leak testing. The positioning device 112 selectively moves the enclosure 110 in one or more directions before, during or after the leak test. In other examples, the enclosure 110 is stationary during the leak test.

During manufacturing of the enclosure, an outer surface of the enclosure 110 is welded at one or more weld locations 114-1, 114-2, ..., and 114-N, where N is an integer. In some examples, one or more of the weld locations 114 may include welds with cracks or defects causing one or more gas leaks (e.g., at 118 above the weld location 114-N). Since the enclosure 110 should be hermetically sealed, the enclosure needs to be repaired prior to usage. During repair, it is difficult to locate and fix the source of the gas leak(s) without knowing the location of the gas leak(s).

In some examples, the leak detection system 100 further includes a gas delivery system 119 to selectively deliver a trace gas to the enclosure 110. In some examples, the gas delivery system 119 includes a trace gas source 120, a valve 122, a pump 124, and a valve 126. The trace gas source 120 and the valve 122 selectively supply trace gas to the enclosure 110. In some examples, the trace gas is selected from a group consisting of carbon dioxide ($CO_2$), a hydrocarbon, a volatile organic compound (VOC), methane, carbon monoxide (CO), helium (He), molecular hydrogen ($H_2$), and/or combinations thereof.

The pump 124 and valve 126 are used to increase pressure within the enclosure 110. If the enclosure 110 has a weld location that leaks, the trace gas in the enclosure 110 is ejected through the leak at the weld and sensed by the optical gas imaging sensor and/or identified using image processing as described herein.

The leak detection system 100 further includes a screen 130 to increase the reliability of the sensing. In some examples, the screen is temperature controlled to a temperature above ambient temperature. The screen introduces a temperature differential between the trace gas and the background provided by the screen 130. In some examples, the screen 130 has an external surface that is black in color to increase emissivity. In some examples, the screen 130 includes a heater 134 (e.g., a resistive heater) to allow the temperature of the screen 130 to be different than the surroundings.

The heater 134 includes one or more heating zones. In some examples, a temperature controller 136 controls a temperature of the screen 130 to a predetermined temperature range. In some examples, the temperature controller 136 receives an output of one or more temperature sensors 137 and adjusts power output to the heater 134 based thereon. In some examples, each zone of the heater 134 includes a corresponding temperature sensor 137. In some examples, the screen 130 is heated to a temperature in a range from 10° F. to 100° F. above ambient temperature of the enclosure or in the location where the leak test is performed. In other examples, the screen 130 is heated to a temperature in a range from 10° F. to 40° F. (e.g., 25° F.) above ambient temperature of the enclosure or in the location where the leak test is performed.

In some examples, the temperature controller 136 and the screen 130 are positioned using a positioning device 138. The positioning device 138 selectively moves the temperature controller 136 and the screen 130 in one or more directions. In other examples, the screen is stationary. A pressure sensor 142 monitors pressure in the enclosure 110. When pressure reaches a predetermined pressure in the enclosure 110, the valves 122 and/or 126 are closed and second and/or third images for the leak test are generated.

An optical gas imaging sensor 150 performs optical gas imaging of surfaces of the enclosure 110. In some examples, the optical gas imaging sensor 150 is a specialized version of an infrared or thermal imaging sensor. The optical gas imaging sensor 150 includes a lens, a detector, electronics to process the signal from the detector, and a viewfinder or screen for the user to see the image produced by the optical gas imaging sensor 150. In some examples, the detector includes an indium antimonide (InSb) detector.

In some examples, the leak detection test is performed on a top surface and edges between the top surface and sides of the enclosure. In some examples, the optical gas imaging sensor 150 is positioned using a positioning device 152. The positioning device 152 selectively moves the optical gas imaging sensor 150 in one or more directions during the leak test. In other examples, the leak detection is performed on a bottom surface and edges between the bottom surface and the sides. In some examples, the top surface is inspected for gas leaks, the enclosure is inverted, and then the bottom surface is inspected for gas leaks. In other examples, the top surface and the bottom surface are inspected using separate optical gas imaging sensors and the enclosures are held from the side surfaces during leak detection.

In some examples, a controller 160 includes an image processor 164 to perform image processing on the images output by the optical gas imaging sensor 150. The image processor 164 receives images generated by the optical gas imaging sensor 150 and identifies when a trace gas cloud is present adjacent to the enclosure and a location of the trace gas cloud on the enclosure (corresponding to the location of the leak). The location of the gas leak can be provided to a repair operation to enable more efficient repairs to be made. In other examples, the location of the gas leak can be provided to a robotic welding machine to allow automated repair.

As can be appreciated, one or more of the positioning devices 112, 138, and/or 152 can be omitted if the corresponding structure (e.g., the enclosure or the optical gas imaging sensor and screen) does not need to move. In some examples, the controller 160 is further used to control one or more of the positioning devices 112, 138, and/or 152. For example, the optical gas imaging sensor 150 and the temperature controller 136 and the screen 130 can be moved relative to the enclosure 110. In other examples, the enclosure 110 can be moved relative to the optical gas imaging sensor 150 and the temperature controller 136 and the screen 130. In some examples, the controller 160 monitors the pressure sensor 142 and controls one or more of the valve 122, the valve 126, and the pump 124 to shut off trace gas flow into the enclosure when a predetermined pressure is reached.

In some examples, a plurality of the enclosures 110 are moved relative to the leak detection system 100 along a conveyor or moving frame connected to a moving rail or conveyor. In other examples, the optical gas imaging sensor 150 and the screen 130 and the temperature controller 136 are moved relative to the enclosures 110. In still other examples, both the leak detection system 100 and the enclosures 110 are moved relative to each other. In still other examples, both the leak detection system 100 and the enclosures 110 are stationary during leak detection.

In some examples, the screen 130 is made of a rigid material or includes a flexible material supported by a frame. In some examples, the screen 130 is sufficiently rigid to allow movement as one piece with the optical gas imaging sensor 150. In some examples, the screen 130 covers an upper portion of the enclosure 110 and/or at least a portion of sides of the enclosure 110. Depending upon the location of the screen 130, the screen 130 also helps to prevent measurement contamination from one sensed location to another sensed location (for example, see FIG. 6).

Figure 2A:
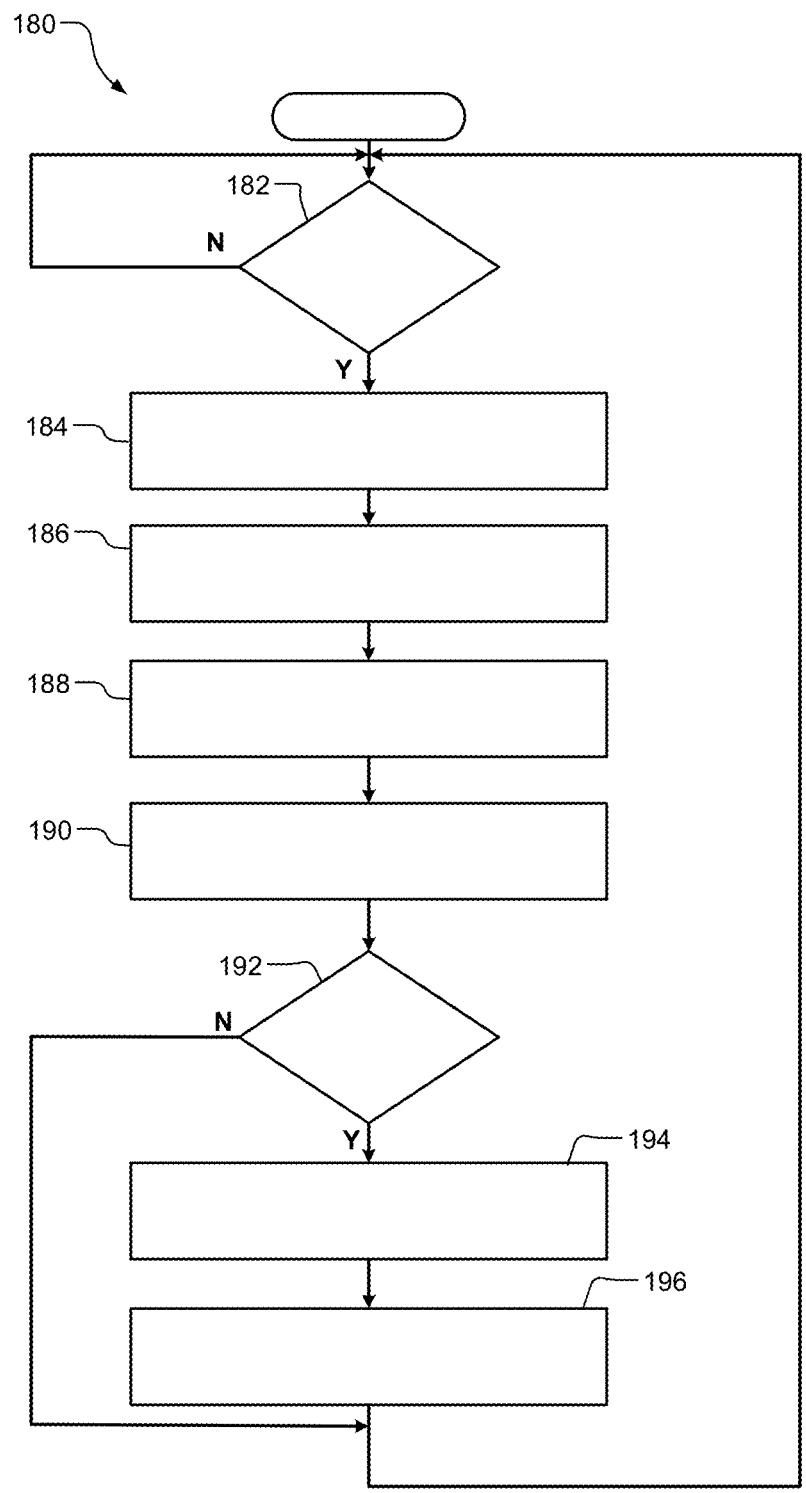
FIG. 2A is a method for detecting leaks in an enclosure for a rechargeable energy storage system, a battery cell, a battery module, and/or a battery pack according to the present disclosure.

Referring now to FIG. 2A, an example of a leak detection method 180 is shown. At 182, the method determines whether an enclosure needs to be tested. If 182 is true, the method positions the enclosure relative to one or more optical gas imaging sensors and temperature-controlled black screen(s) (or vice versa) at 184. At 186, the method generates one or more first images to measure background radiation (using the one or more optical gas imaging sensors with a first field of view setting). After completing 186, the method pressurizes the enclosure with gas including trace gas to a predetermined pressure at 188.

At 190, the method generates one or more second images measuring background radiation (using the one or more optical gas imaging sensors with the first field of view). At 192, the method determines whether a trace gas cloud is detected based on a comparison of the one or more first images and the one or more second images. In some examples, the presence of the gas cloud and the location of the gas leak are determined at this point. In other examples, the field of view is reduced based on the estimated location of the gas cloud and/or gas leak to increase resolution.

If 192 is true, the method optionally changes the first field of view to a second field of view (narrower than the first field of view) based on the estimated location of the gas cloud and/or the gas leak. In other words, the optical gas imaging sensor 150 indexes or focuses on the estimated location of the gas leak or gas cloud and takes one or more third images with finer resolution. At 196, the method determines the presence of a gas cloud and the location of the gas leak based on the difference between the background radiation measurements before and after filling of the enclosure with the trace gas and/or further based on the one or more third images taken after changing the field of view.

In some examples, the screen 130 is painted black and optionally heated to a predetermined temperature greater than ambient temperature during leak testing to increase emissivity and provide temperature contrast between the unheated trace gas cloud and the heated background provided by the screen 130.

Figure 2B:
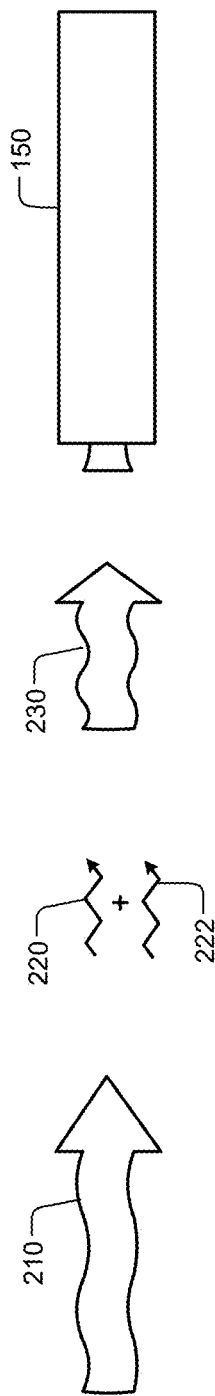
FIG. 2B illustrates an example of background radiation travelling from a heated black screen to an optical gas imaging sensor during leak testing of an enclosure according to the present disclosure.

Referring now to FIG. 2B, background radiation 210 produced by the screen 130 combines with transmitted radiation 220 and/or emitted radiation 222 as it travels towards the optical gas imaging sensor 150. If the background radiation produced by the screen 130 does not pass through a trace gas cloud, it would remain relatively unchanged. If the background radiation passes through trace gas in the gas cloud, background radiation 230 received by the optical gas imaging sensor 150 is different due to absorption that occurs when passing through the trace gas cloud (and/or the contrast in temperature between the unheated gas cloud and the heated screen).

A portion of the background radiation 210 is absorbed in a predetermined wavelength range that is a characteristic of the trace gas from the trace gas source. The optical gas imaging sensor 150 filters the background radiation received (through the trace gas cloud if present) using the filter. The filter includes a band pass region surrounding a wavelength corresponding to an absorption wavelength characteristic of the trace gas supplied by the trace gas source.

For example, a wavelength from 4.2 μm to 4.4 μm can be used when carbon dioxide ($CO_2$) is used. When the absorption is high and transmittance is low, the trace gas from the trace gas source is present. When the absorption is low and transmittance is high, the trace gas from the trace gas source is not present. The optical gas imaging sensor 150 uses this information to determine a shape and size of the trace gas cloud, an accurate position of the leak on the enclosure, a gas leak rate, and/or a size of the crack or defect based on the gas leak rate.

Figure 3:
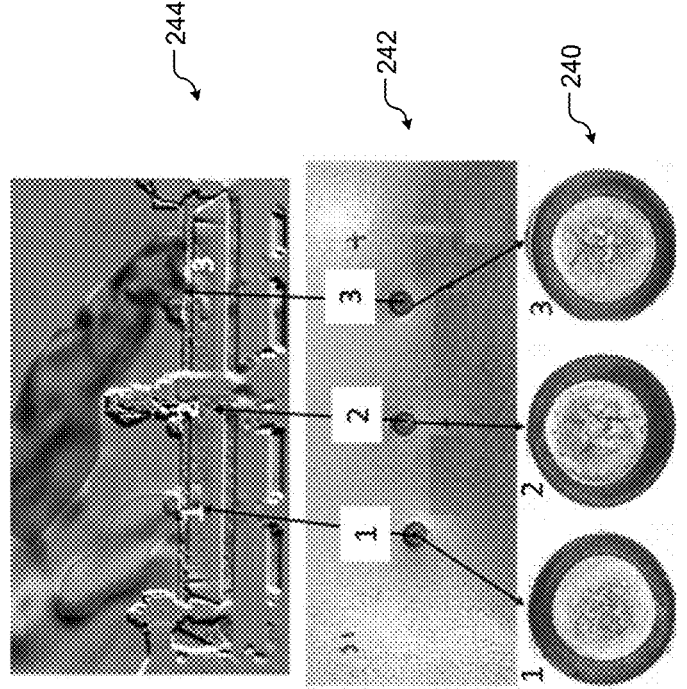
FIG. 3 illustrates examples of welds on the enclosure with cracks that may or may not leak and gas clouds produced by the leaking welds.

Referring now to FIG. 3, various examples of welds (e.g., welds 1, 2 and 3) are shown at 240 and 242 along with their corresponding trace gas clouds (if leaking) at 244. While weld 1 does not appear to have a surface crack, weld 1 leaks and produces a trace gas cloud. Weld 2 has a surface crack but does not leak. Weld 3 has higher leakage than weld 1 due to a higher number of cracks and/or defects connecting an outer surface to a location inside of the weld 3. As can be appreciated, it can be difficult to determine where the gas leak is located using surface inspection.

Figure 4:
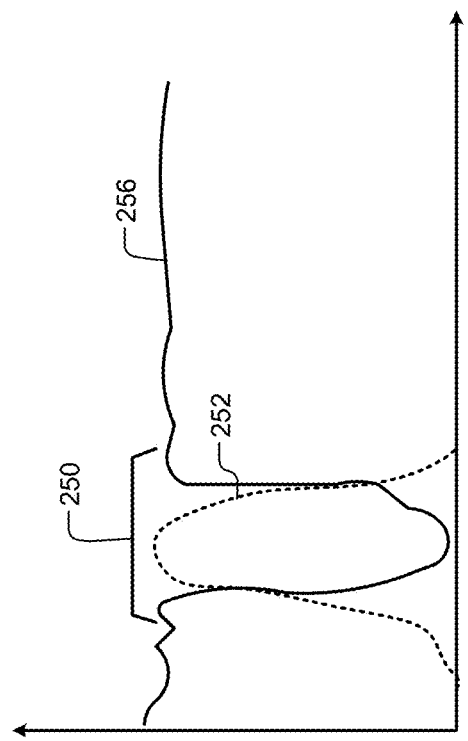
FIG. 4 is a graph illustrating an example of transmittance and absorbance of the background radiation from the screen as a function of wavelength for a gas filter detector of the optical gas imaging sensor according to the present disclosure.

Referring now to FIG. 4, an example of the response of the trace gas filter of the optical gas imaging sensor is shown. The trace gas filter is a bandpass filter that includes a bandpass region 250 that is arranged to pass a wavelength corresponding to an absorbance wavelength of the trace gas species supplied by the trace gas source. When the trace gas cloud is present, the trace gas in the trace gas cloud absorbs background radiation (absorbance 252 increases) and the transmittance 256 decreases. In addition, the temperature difference of the screen 130 provides additional contrast to allow a location, shape and size the trace gas cloud to be sensed by the optical gas imaging sensor.

Figure 5:
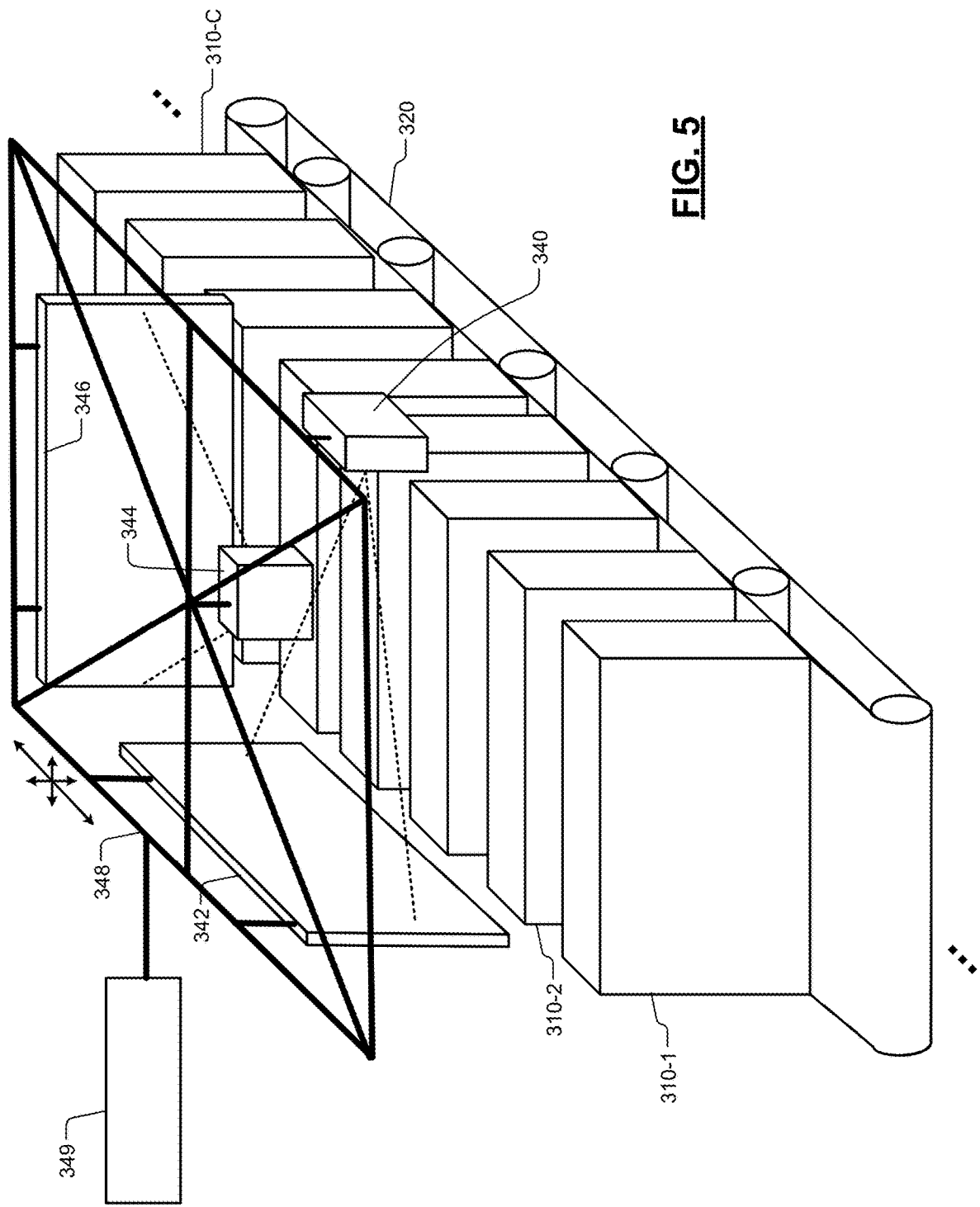
FIGS. 5 and 6 are examples of leak detection systems including more than one thermal imaging system according to the present disclosure.

The leak detection system can have various numbers of optical gas imaging sensors positioned and/or moved in various ways. Referring now to FIG. 5, a plurality of enclosures 310-1, 310-2, . . . , and 310-C are moved by a positioning device 320 (e.g., a conveyor) (where C is an integer greater than one). In other examples, the plurality of enclosures are held from the sides to allow leak detection from the top side and bottom side of the enclosure at the same time or sequentially. In other examples, the positioning devices 138 of the screen 130 and the temperature controller 136 and/or the optical gas imaging sensor 150 are connected to a moving frame and moved together relative to one or more surfaces of stationary or moving enclosures.

For example, a leak detection system includes a first optical gas imaging sensor 340 and screen 342 arranged along first edges of the enclosures 310. The leak detection system includes a second optical gas imaging sensor 344 and screen 346 arranged along second edges of the enclosures 310. The second optical gas imaging sensor 344 and the screen 346 are arranged at an angle relative to the first optical gas imaging sensor 340 and the screen 342. In some examples, the angle is in a range from 45° to 135° (e.g., 90°). In this example, leak detection is performed at orthogonal angles.

In some examples, a moving frame 348 is connected to the screens 342, 346 and the optical gas imaging sensors 340 and 344. A positioning device 349 is connected to the frame 348 to move the frame 348 along a rail or track relative to the enclosures 310.

Figure 6:
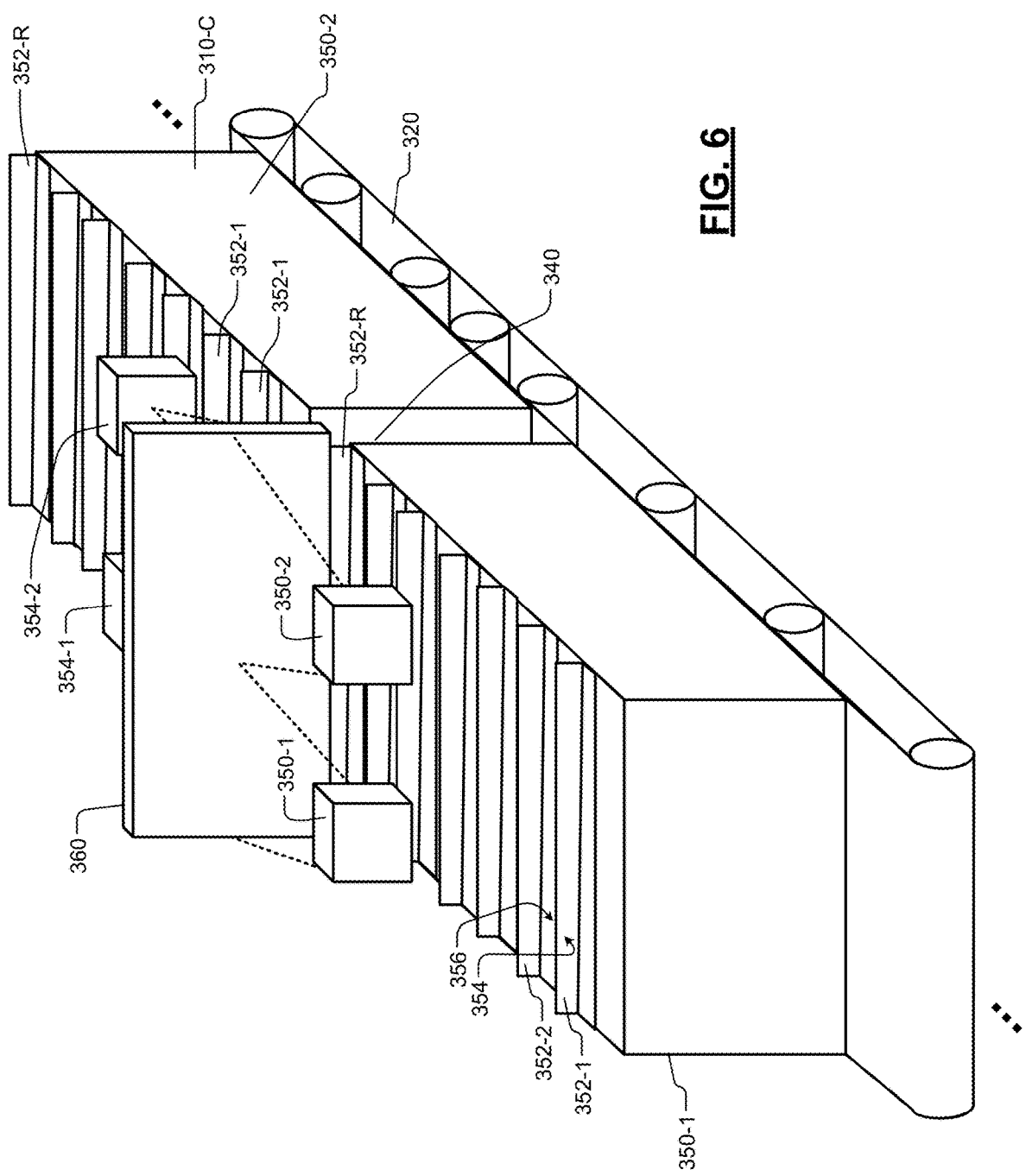

Referring now to FIG. 6, a plurality of pack enclosures 350-1, 350-2, . . . , (collectively pack enclosures 350) are moved by a positioning device 320 such as a conveyor. In some examples, the pack enclosures 350 include rails 352-1, 352-2, . . . , and 352-R that project upwardly from upper and/or lower surfaces of the enclosure. The rails 352 include welds located on both sides thereof. A leak detection system includes one or more first optical gas imaging sensors (optical gas imaging sensors 350-1 and 350-2 shown) arranged above (and/or below) the pack enclosures 350 and facing one side of a screen 356 (e.g., in a first direction).

The leak detection system includes one or more second optical gas imaging sensors (optical gas imaging sensors 354-1 and 354-2 shown) above (and/or below) the pack enclosures 350 facing the opposite side of the screen (or a side of another screen) (e.g., in a second direction). In some examples, the first direction and the second direction are opposite to one another. As a result of this orientation, the pack enclosure 350 can be inspected for leakage of welds on both sides of the rails 352 using a single pass (without contamination of the measurement from the other side of the rail).

In some examples, the screen 356 is arranged parallel to the rails 352 and is moved in a direction transverse to the rails 352. As can be appreciated, a moving frame and positioning device similar to FIG. 5 can be used instead of or in addition to the positioning device 320.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A leak detection system for an enclosure, comprising:
   a gas delivery system configured to selectively provide a trace gas to the enclosure;
   a first optical gas imaging sensor configured to generate images of a surface of the enclosure after the gas delivery system charges the enclosure with trace gas; and
   a second optical gas imaging sensor configured to generate images of the surface of the enclosure after the gas delivery system charges the enclosure with trace gas;
   a first temperature-controlled screen, wherein the surface of the enclosure is arranged between the first optical gas imaging sensor and the first temperature-controlled screen; and
   a second temperature-controlled screen, wherein the surface of the enclosure is arranged between the second optical gas imaging sensor and the second temperature-controlled screen,
   wherein the first optical gas imaging sensor and the first temperature-controlled screen are arranged at an angle relative to the second optical gas imaging sensor and the second temperature-controlled screen, and the angle is in a range from 45 degrees to 135 degrees, to perform gas leak detection on multiple sides of the enclosure sequentially or at a same time,
   wherein the images are used to selectively detect a gas cloud adjacent to the surface of the of the enclosure,
   wherein the gas cloud is used to determine a location of gas leak on the surface of the enclosure.

2. The leak detection system of claim 1, further comprising a positioning device configured to position one of the first optical gas imaging sensor and the enclosure relative to the other of the first optical gas imaging sensor and the enclosure.

3. The leak detection system of claim 1, wherein an outer surface of the first temperature-controlled screen is black.

4. The leak detection system of claim 1, wherein the first temperature-controlled screen is heated to a temperature in a range from 10° F. to 100° F. above an ambient temperature.

5. The leak detection system of claim 1, wherein the gas delivery system includes a trace gas source and a valve fluidly connecting the trace gas source to the enclosure.

6. The leak detection system of claim 5, wherein the gas delivery system includes a pump and the valve fluidly connecting the pump to the enclosure.

7. The leak detection system of claim 1, wherein the gas delivery system supplies a trace gas selected from a group consisting of carbon dioxide ($CO_2$), a hydrocarbon, a volatile organic compound (VOC), methane, carbon monoxide (CO), helium (He), molecular hydrogen ($H_2$), and/or combinations thereof.

8. The leak detection system of claim 1, wherein the first optical gas imaging sensor includes a gas filter having a predetermined pass band around an absorption wavelength of the trace gas.

9. The leak detection system of claim 1, further comprising a controller configured to communicate with the first optical gas imaging sensor, to detect the gas cloud adjacent to the surface of the enclosure, and to determine a position of a gas leak in response to the gas cloud.

10. The leak detection system of claim 1, wherein the first optical gas imaging sensor is configured to take a first image of the surface of the enclosure before the trace gas is supplied by the gas delivery system, and to take a second image of the surface of the enclosure after the trace gas is supplied to the enclosure.

11. The leak detection system of claim 10, wherein the first optical gas imaging sensor is configured to reduce a field of view of the first optical gas imaging sensor after the second image in response to the gas cloud being identified and to take a third image using the reduced field of view, wherein the location of the gas leak is based on the third image.

12. A method for detecting a gas leak in an enclosure, comprising:
 selectively providing a trace gas to the enclosure;
 arranging the enclosure between a first temperature-controlled screen and a first optical gas imaging sensor, and between a second temperature-controlled screen and a second optical gas imaging sensor;
 generating images of a surface of the enclosure using the first optical gas imaging sensor after the enclosure is charged with trace gas;
 generating images of the surface of the enclosure using a second optical gas imaging sensor after the enclosure is charged with trace gas, wherein the first optical gas imaging sensor and the first temperature-controlled screen are arranged at an angle relative to the second optical gas imaging sensor and the second temperature-controlled screen, and the angle is in a range from 45 degrees to 135 degrees, to perform gas leak detection on multiple sides of the enclosure sequentially or at a same time;
 selectively detecting a gas cloud adjacent to the surface of the of the enclosure; and
 in response to detecting the gas cloud, determining a location of a gas leak on the surface of the enclosure.

13. The method of claim 12, further comprising positioning one of the first optical gas imaging sensor and the enclosure relative to the other of the first optical gas imaging sensor and the enclosure.

14. The method of claim 12, wherein:
 an outer surface of the first temperature-controlled screen is black, and
 the first temperature-controlled screen is heated to a temperature in a range from 10° F. to 100° F. above an ambient temperature.

15. The method of claim 12, wherein the trace gas is selected from a group consisting of carbon dioxide ($CO_2$), a hydrocarbon, a volatile organic compound (VOC), methane, carbon monoxide (CO), helium (He), molecular hydrogen ($H_2$), and/or combinations thereof.

16. The method of claim 12, further comprising using a gas filter having a predetermined pass band around an absorption wavelength of the trace gas.

17. The method of claim 12, further comprising:
 taking a first image of the surface of the enclosure before the trace gas is supplied using the first optical gas imaging sensor;
 taking a second image of the surface of the enclosure after the trace gas is supplied to the enclosure using the first optical gas imaging sensor;
 reducing a field of view after the second image in response to the gas cloud being identified; and
 taking a third image using the reduced field of view using the first optical gas imaging sensor, wherein the location of the gas leak is determined in response to the third image.

* * * * *